E. SCHNEIDER.
AUTOMATIC APPARATUS FOR LOCKING THE CRADLE AND PEDESTAL OF GUNS OF SMALL CALIBER
DURING THEIR RECOIL AND RETURN INTO FIRING POSITION.
APPLICATION FILED AUG. 21, 1918.

1,310,894.

Patented July 22, 1919.

Inventor.
Eugène Schneider,
by Mauro, Cameron, Lewis & Massie,
Attorneys.

E. SCHNÉIDER.
AUTOMATIC APPARATUS FOR LOCKING THE CRADLE AND PEDESTAL OF GUNS OF SMALL CALIBER DURING THEIR RECOIL AND RETURN INTO FIRING POSITION.
APPLICATION FILED AUG. 21, 1918.

1,310,894.

Patented July 22, 1919.

E. SCHNEIDER.
AUTOMATIC APPARATUS FOR LOCKING THE CRADLE AND PEDESTAL OF GUNS OF SMALL CALIBER
DURING THEIR RECOIL AND RETURN INTO FIRING POSITION.
APPLICATION FILED AUG. 21, 1918.

1,310,894.
Patented July 22, 1919.
7 SHEETS—SHEET 3.

E. SCHNEIDER.
AUTOMATIC APPARATUS FOR LOCKING THE CRADLE AND PEDESTAL OF GUNS OF SMALL CALIBER DURING THEIR RECOIL AND RETURN INTO FIRING POSITION.
APPLICATION FILED AUG. 21, 1918.

1,310,894.
Patented July 22, 1919.
7 SHEETS—SHEET 5.

E. SCHNEIDER.
AUTOMATIC APPARATUS FOR LOCKING THE CRADLE AND PEDESTAL OF GUNS OF SMALL CALIBER
DURING THEIR RECOIL AND RETURN INTO FIRING POSITION.
APPLICATION FILED AUG. 21, 1918.

1,310,894.

Patented July 22, 1919.
7 SHEETS—SHEET 6.

Inventor.
Eugène Schneider,
by Mauro, Cameron, Lewis & Massie,
Attorneys

E. SCHNEIDER.
AUTOMATIC APPARATUS FOR LOCKING THE CRADLE AND PEDESTAL OF GUNS OF SMALL CALIBER DURING THEIR RECOIL AND RETURN INTO FIRING POSITION.
APPLICATION FILED AUG. 21, 1918.

1,310,894.

Patented July 22, 1919.
7 SHEETS—SHEET 7.

Inventor.
Eugene Schneider,
by Mauro, Cameron, Lewis & Massie
Attorneys.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

AUTOMATIC APPARATUS FOR LOCKING THE CRADLE AND PEDESTAL OF GUNS OF SMALL CALIBER DURING THEIR RECOIL AND RETURN INTO FIRING POSITION.

1,310,894.    Specification of Letters Patent.    Patented July 22, 1919.

Application filed August 21, 1918. Serial No. 250,864.

*To all whom it may concern:*

Be it known that I, EUGÈNE SCHNEIDER, citizen of the French Republic, residing at 42 Rue d'Anjou, Paris, France, have invented certain new and useful Improvements in Automatic Apparatus for Locking the Cradle and Pedestal of Guns of Small Caliber During Their Recoil and Return into Firing Position, of which the following is a specification.

In guns of small caliber which are adapted to be elevated by means of a shoulder piece fixed to the gun cradle, it has already been proposed to employ a catch between the gun cradle and the gun pedestal, controlled by a part fixed to the gun barrel, for the purpose of preventing the gun barrel from coming out of its adjusted elevation during the recoil and the running-out movement of the gun barrel.

The known devices employed for this purpose are very uncertain in operation. Although they prevent the cradle from moving down in consequence of the displacement of the center of gravity of the recoiling mass, yet they are not adapted to prevent an oscillation in the opposite direction that may be due to an untimely movement by the gunner.

The present invention has for its object to provide an improved apparatus for locking together the gun cradle and the gun pedestal during the recoil and the running-out movement of the barrels of guns of small caliber, whereby the above stated drawbacks are entirely avoided. The improved apparatus is further so constructed as to be capable of being sufficiently sheltered.

The improved apparatus of this invention comprises devices which enable a jamming action to be produced between the trunnions of the cradle and the bearings for said trunnions. The moving of the said devices away from each other or nearer to each other for effecting the desired locking and unlocking of the parts is controlled by a spring push member located in the axis of the said trunnions, and is itself adapted to be operated by a projection on the gun barrel.

This improved apparatus serves to lock the cradle to the gun pedestal so as to prevent any downward movement as well as any upward movement relatively thereto, while its constituent members are located in parts capable of being efficiently sheltered.

Some constructional examples of this invention are illustrated in the accompanying drawings in which:

In Figs. 4 and 5, the parts are shown in the positions they occupy in the run-out position of the gun barrel.

Figs. 11 to 14 illustrate a second constructional form of the invention.

In both figures, the members of the improved locking apparatus are shown in the position they occupy when the gun barrel is run-out.

Figs. 15 to 18 illustrate a modification of the constructional form of Figs. 11 to 14.

In these two figures the members of the improved locking apparatus are shown in the position they occupy when the gun barrel is run-out.

In all these figures: A is a gun barrel of small caliber adapted to recoil in a cradle B, which latter is journaled in a pedestal C. The elevating of the gun barrel is effected in the known manner by means of a shoulder piece D located at the end of an arm E fixed to one of the trunnions of the cradle.

In the first embodiment of the invention illustrated in Figs. 1 to 10, the locking members consist of knuckle members F having a jamming action located between the inner surface $b$ of one of the trunnions of the cradle, and the cap G of the bearing of said trunnion which is carried by the pedestal C. The knuckle members F are pivotally mounted by means of their parts $f$ engaging in the cap G. The cylindrical jamming surface $f^1$ of each knuckle member is eccentric relatively to the inner surface $b$ of the cradle trunnion. $F^1$ are springs having a normal tendency to move the knuckle members away from their side support on the cap G, and to move them into their jamming position. The action of the springs $F^1$ is however prevented in the rest position (run-out position of the gun barrel) by a spring push member H located in the cradle trunnion in the axis of said trunnion. This push member is held in the position in which the knuckle members are inoperative by the pressure that is exerted upon it by a projection $a$ on the gun barrel. The projection $a$ has a concave conical bearing surface $a^1$ designed to coöperate with the correspondingly conical head of the push member. This arrangement allows the gun barrel to be elevated in its run-out position without moving the push member and the parts upon which the latter acts.

When the gun is fired, the gun barrel A recoils and the push member H is forced inwardly by its spring. In this movement it frees the knuckle members F which are pushed by their springs $F^1$ into the jamming position shown in Figs. 7, 8 and 9.

Figure 1:
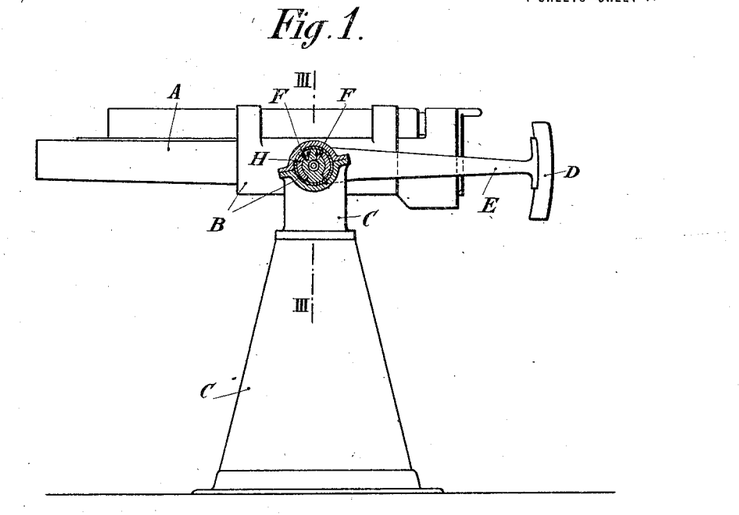
Figure 1 is a side elevation partly in section, in a plane at right angles to the axis of one of the trunnions of the cradle, of a gun of small caliber adapted to be elevated by means of a shoulder piece, and provided with one constructional form of the improved locking apparatus.
Figure 2:
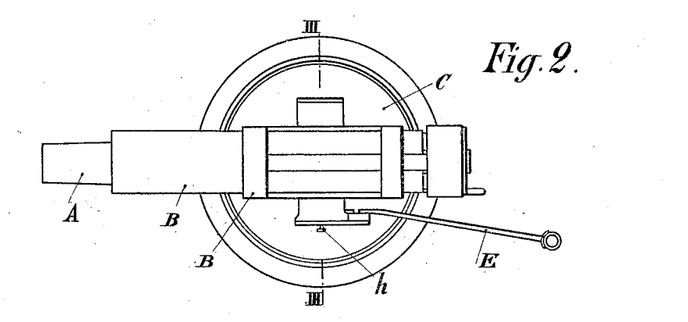
Fig. 2 is a corresponding plan.
Figure 3:
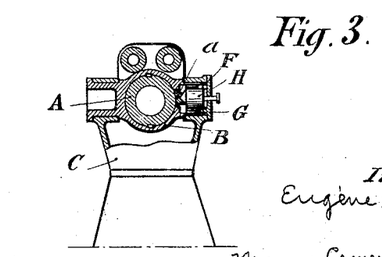
Fig. 3 is a partial vertical section on the line III—III of Figs. 1 and 2.
Figures 4, 6, 10:
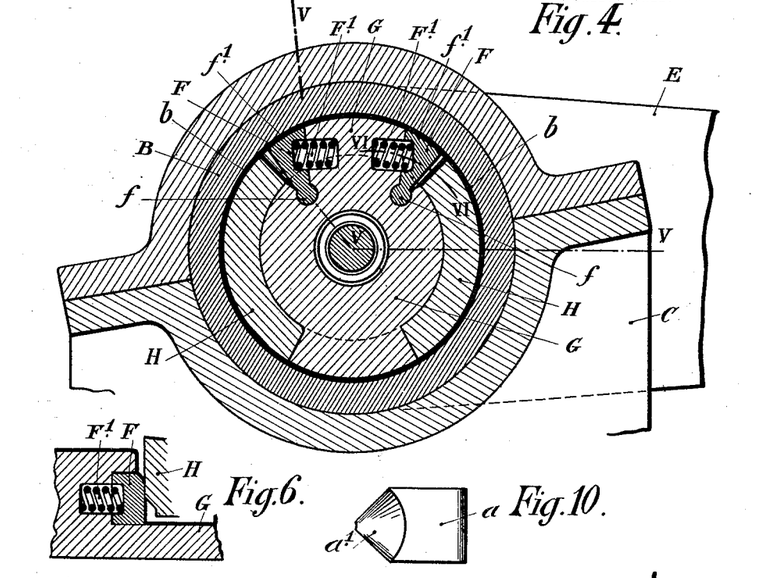
Fig. 4 is a detail vertical section on a larger scale, in a plane at right angles to the axis of the trunnion in which the improved locking apparatus is located; the section being on the line IV—IV of Fig. 5.
Fig. 6 is a developed partial section on the line VI—VI of Fig. 4.
Fig. 10 is an elevation of the projection carried by the gun barrel for operating the push member.
Figure 5:
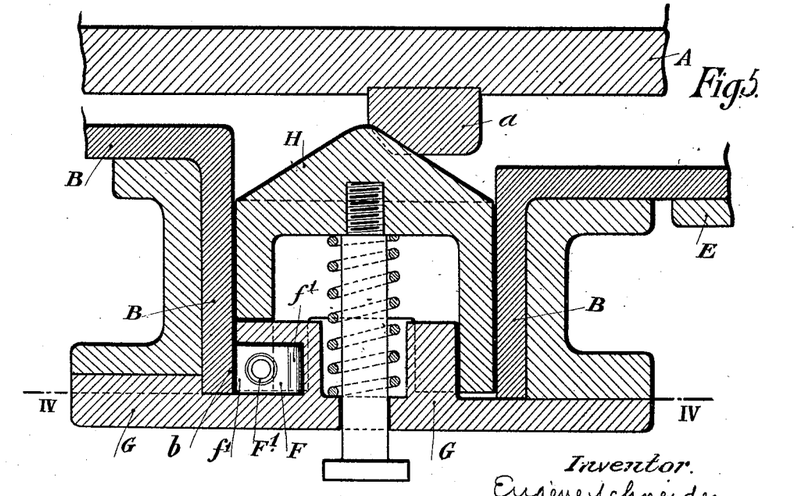
Fig. 5 is a section on the line V—V of Fig. 4.
Figures 7, 9:
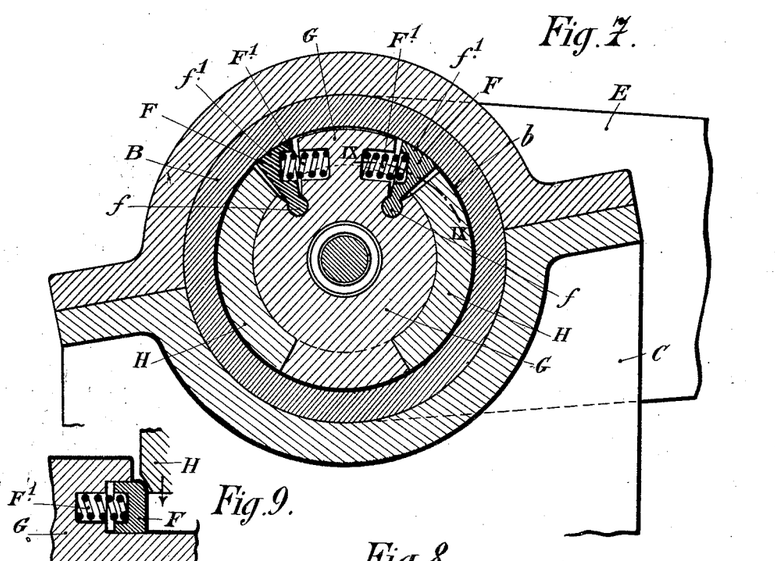
Figs. 7 and 8 are sections respectively similar to Figs. 4 and 5, the parts being shown in the locking position during the recoil and the running-out movement of the gun barrel.
Fig. 9 is a partial section on the line IX—IX of Fig. 7.
Figure 8:
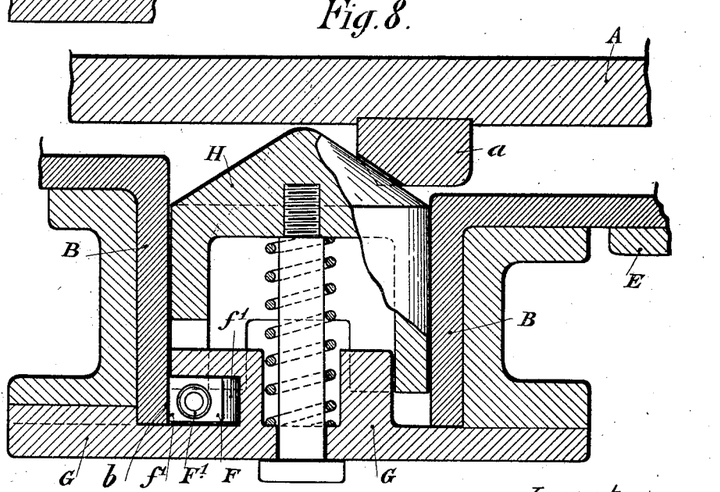

When the gun barrel returns, i. e., is run out into firing position, the projection $a$ on the gun barrel in moving past the position shown in Fig. 8, forces the push member H outward and thus returns the knuckle members F into their initial positions shown in Figs. 4, 5 and 6.

In the embodiment of the invention shown in Figs. 11 to 14, the jamming action for locking the cradle to the gun pedestal is produced between the inner surface $b^1$ of a sector $B^1$ (fixed to the cradle trunnion) and the outer surface $g$ of a sector $G^1$ that is carried by the cap G of the bearing of the said trunnion. The surface $b^1$ is concentric to the cradle trunnion. The surface $g$ has a greater radius and has its center at a point $g^1$ located outside the axis of the trunnion. The jamming members consist of rollers K of such diameter that they will rub against the surfaces $g$ and $b^1$ when, having been moved apart by the expansion of the spring $K^1$, they are brought into the narrow portions of the space comprised between the said surfaces.

Figure 11:
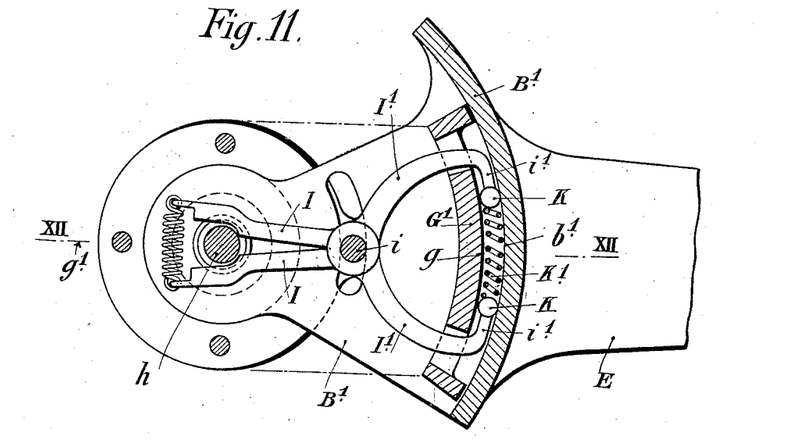
Fig. 11 is an elevation partly in section on the line XI—XI of Fig. 12.
Figure 12:
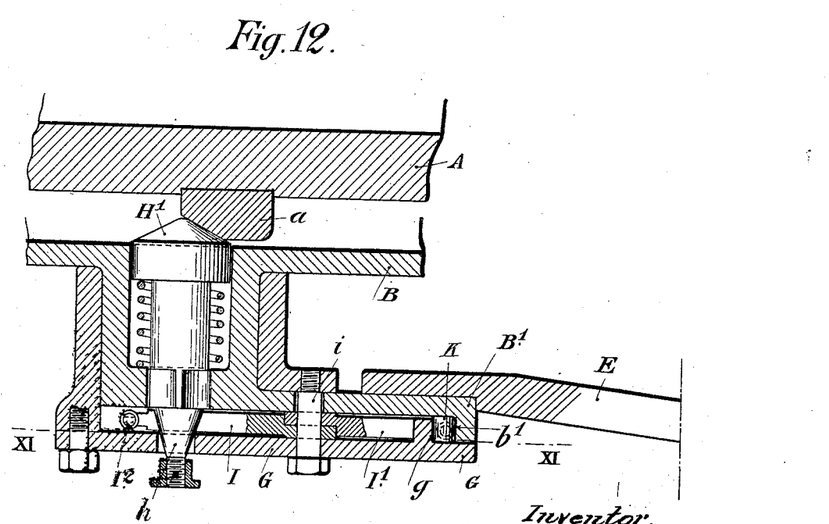
Fig. 12 is a horizontal section on the line XII—XII of Fig. 11.
Figure 13:
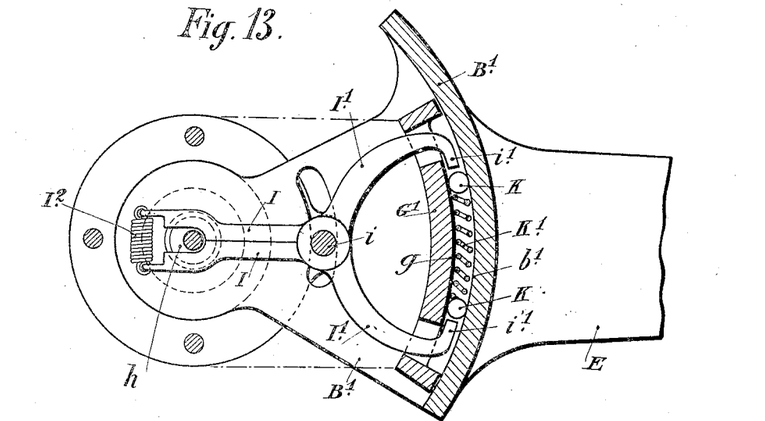
Figs. 13 and 14 are views corresponding respectively to Figs. 11 and 12; they show the position occupied by the members of the improved locking apparatus at the commencement of the recoil or toward the end of the running-out movement of the gun barrel.
Figure 14:
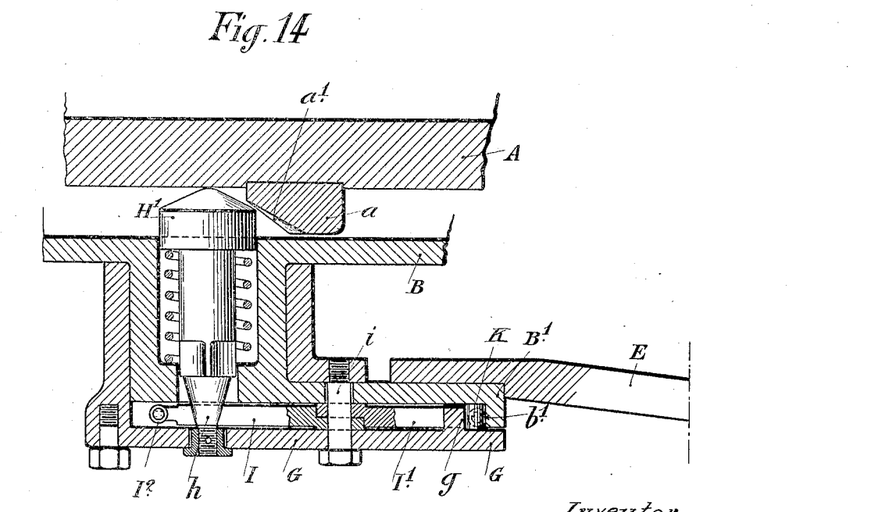
Figure 15:
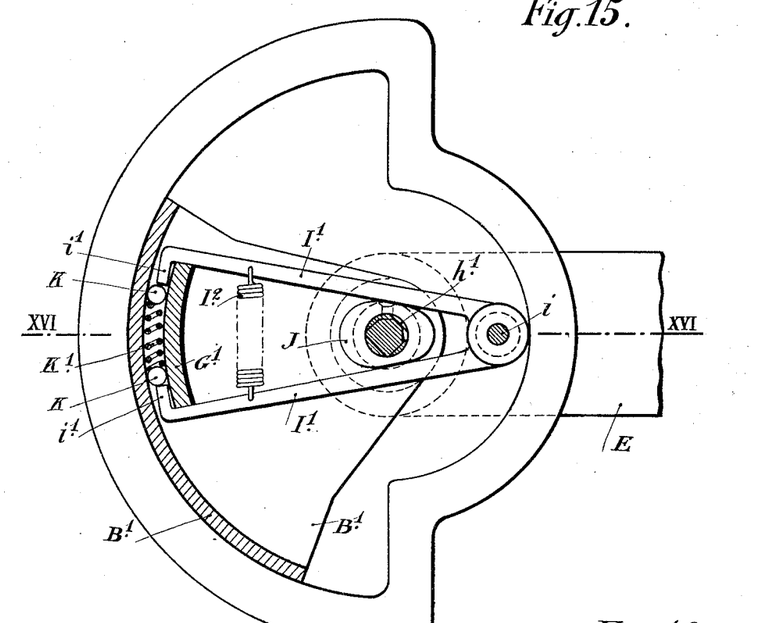
Fig. 15 is an elevation partly in section on the line XV—XV of Fig. 16.
Figure 16:
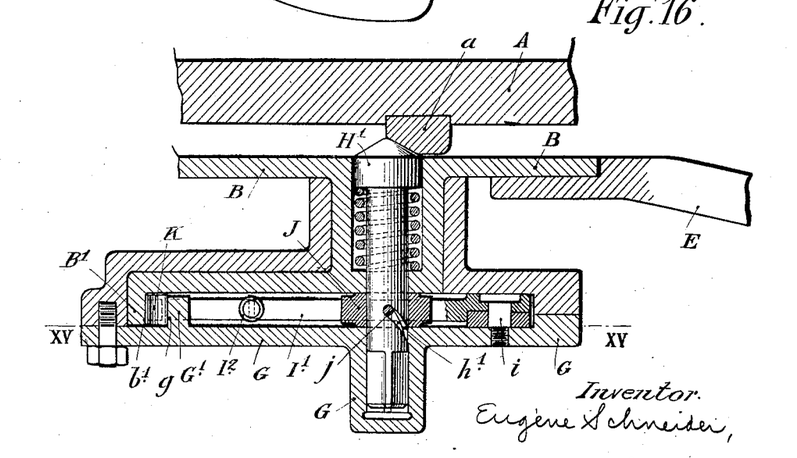
Fig. 16 is a horizontal section on the line XVI—XVI of Fig. 15.

The mutual approach of the rollers K is assured normally by the action of a spring push member $H^1$ similar to the push member of the preceding embodiment, having a tail $h$ adapted to move between the limbs I of a tongs. This tongs is fulcrumed on an axle $i$ carried by the bearing of the cradle trunnion, and the ends $i^1$ of its limbs $I^1$ serve as abutments for the rollers K.

Normally, when the projection $a$ located on the gun barrel A, pushes the push member $H^1$ outwardly, the tail $h$ of the latter will move the limbs I of the tongs apart, thereby tensioning the spring $I^2$ and thus moving the limbs $I^1$ nearer to each other, which latter will hold the rollers K in the wide portion of their lodgment, thereby compressing the spring $K^1$.

As soon as the gun barrel recoils, the projection $a$ in moving away releases the push member $H^1$ which is forced inwardly by its spring. The inward movement of the tail $h$ of the push member allows the spring $I^2$ to move the limbs I of the tongs toward each other (Figs. 13 and 14), and to move at the same time the limbs $I^1$ away from each other. The spring $K^1$, in expanding, forces the rollers K away from each other and keeps them jammed between the surfaces $b^1$ and $g$.

In the modification of this embodiment illustrated in Figs. 15 to 18, the surfaces $b^1$ and $g$, between which the locking members are jammed in the recoil of the gun barrel, are formed as in the preceding embodiment respectively on the inside of a sector $B^1$ carried by the cradle trunnion, and on the outside of a sector $G^1$ of larger radius formed on an inner rib of the cap G of the cradle trunnion bearing.

The jamming members are likewise constituted by two rollers K to which a constant tendency to remain in the wide portion of their lodgment is imparted by abutments $i^1$ formed on the free ends of the two limbs of a tongs I¹, I¹, against the tension of the spring K¹, the said limbs being arranged to be moved nearer to each other by the action of a stronger spring I².

Figure 17:
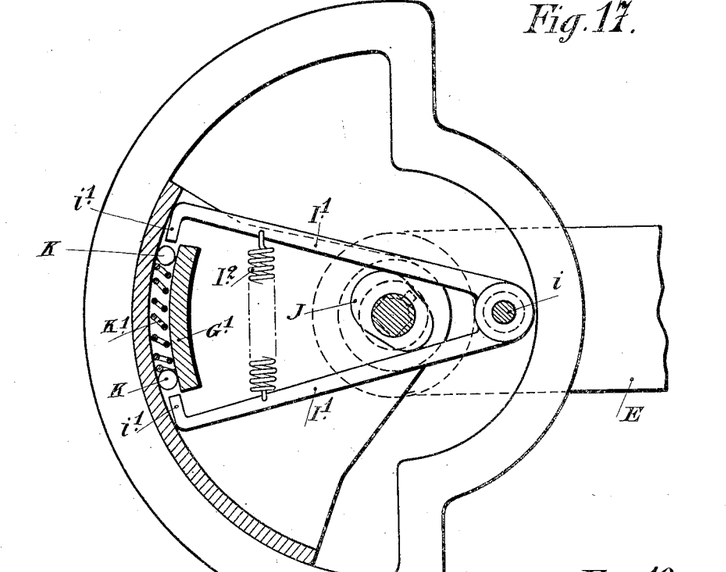
Figs. 17 and 18 are views corresponding respectively to Figs. 15 and 16; they show the position of the members of the improved locking apparatus at the commencement of the recoil or toward the end of the running-out movement of the gun barrel.
Figure 18:
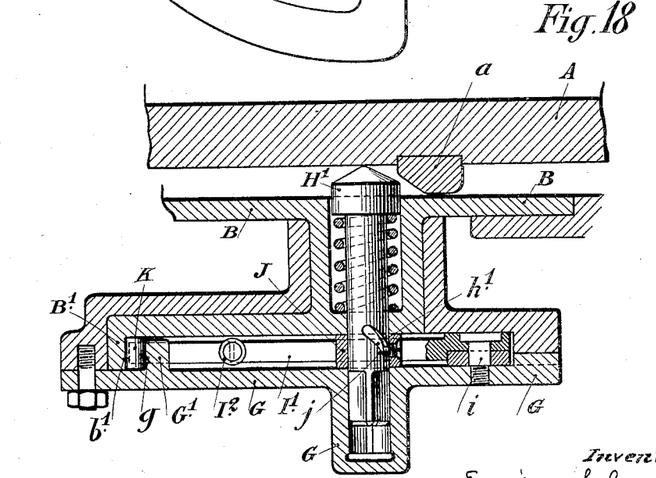

The moving apart of the limbs I¹ of the tongs is effected, at the recoil, by the inward movement of the push member H¹ produced by the action of its spring. This movement causes the rotation of a separating cam J guided by means of a stud $j$ working in a helical groove $h^1$ formed in the stem of the push member H¹.

In all the examples shown, it has been assumed that only one locking apparatus is located between the cradle trunnion that is nearest to the shoulder piece and the bearing of the said trunnion. It is however to be understood that, if required, a similar apparatus may be provided between the other cradle trunnion and its bearing.

It is also to be understood that the improved locking apparatus serves to lock the cradle to the gun pedestal during the recoil and during the running-out movement of the gun barrel, both as regards the downward movement as well as the rising movement of the parts, and that all the members of the locking apparatus are effectively sheltered.

Having now described my invention, what I claim as new and desire to secure by Letters Patent is:—

1. In apparatus for locking the gun cradle to the pedestal during the recoil and running-out movement of the gun barrel, the combination with a trunnion of the cradle and its bearing, of a jamming member between said trunnion and bearing, and means controlled by the movement of the gun barrel for moving said member into jamming position to automatically lock the cradle to the pedestal.

2. In apparatus for locking the gun cradle to the pedestal during the recoil and running-out movement of the gun barrel, the combination with a trunnion of the cradle and its bearing, of a jamming member between said trunnion and bearing, means normally tending to move said member into jamming position, and means controlled by the gun barrel for retaining said member out of jamming position when the gun barrel is in run-out position.

3. In apparatus for locking the gun cradle to the pedestal during the recoil and running-out movement of the gun barrel, the combination with a trunnion of the cradle and its bearing, of a jamming member between said trunnion and bearing, a spring tending to move said member into jamming position, an element for retaining said member out of jamming position, and means on the gun barrel for operating said element to release said member.

4. In apparatus for locking the gun cradle to the pedestal during the recoil and running-out movement of the gun barrel, the combination with a trunnion of the cradle and its bearing, of a jamming member between said trunnion and bearing, a spring tending to move said member into jamming position, an element controlling the movement of said member into and out of jamming position, a spring normally tending to move said element in one direction, and means on the gun barrel for moving said element in the opposite direction.

5. In apparatus for locking the gun cradle to the pedestal during the recoil and running-out movement of the gun barrel, the combination with a trunnion of the cradle and its bearing, of a jamming member between said trunnion and bearing, an element controlling the movement of said member into and out of jamming position, and means on the gun barrel for operating said element.

6. In apparatus for locking the gun cradle to the pedestal during the recoil and running-out movement of the gun barrel, the combination with a trunnion of the cradle and its bearing, of two jamming members between said trunnion and bearing, a rectilineally movable element located in the axis of said trunnion for controlling the operation of said jamming members, and means on the gun barrel for operating said last-named element.

7. In apparatus for locking the gun cradle to the pedestal during the recoil and running-out movement of the gun barrel, the combination with a trunnion of the cradle and its bearing, of two jamming members between said trunnion and bearing, a rectilineally movable element for moving said members in one direction, resilient means for moving said members in the opposite direction, and means on the gun barrel for operating said element.

8. In apparatus for locking the gun cradle to the pedestal during the recoil and running-out movement of the gun barrel, the combination with a trunnion of the cradle and its bearing, of two jamming members between said trunnion and bearing, resilient means for forcing said members into jamming position, a rectilineally movable element for controlling the movement of said members, and means on the gun barrel for operating said element.

9. In apparatus for locking the gun cradle to the pedestal during the recoil and running-out movement of the gun barrel, the combination with a trunnion of the cradle and its bearing, of two jamming members between said trunnion and bearing, resilient means for forcing said members into jaming position, a rectilineally movable element for controlling the movement of said members, a spring normally urging said element in one direction, and means on the gun barrel for moving said element in the opposite direction.

10. In apparatus for locking the gun cradle to the pedestal during the recoil and running-out movement of the gun barrel, the combination with a trunnion of the cradle and its bearing, of a jamming member between said trunnion and bearing, and automatic means for moving said member into its jamming position during the recoil and running-out movement of the gun barrel.

11. In apparatus for locking the gun cradle to the pedestal during the recoil and running-out movement of the gun barrel, the combination with a trunnion of the cradle and its bearing, of a spring-operated jamming member between said trunnion and bearing, and automatic means for releasing said jamming member to permit the same to move into jamming position while the gun barrel is recoiling and returning to its run-out position.

In testimony whereof I have affixed my signature in presence of two witnesses.

EUGÈNE SCHNEIDER.

Witnesses:
ANDRÉ MOSTICKER,
JOHN F. SIMONS.

Copies of this patent may be obtained for five cents each, by addressing the "Commissioner of Patents, Washington, D. C."